United States Patent [19]

Sander et al.

[11] Patent Number: 5,073,271

[45] Date of Patent: Dec. 17, 1991

[54] UTILIZATION OF SOOT FROM SYNTHESIS GAS PRODUCTION IN SEWAGE TREATMENT

[75] Inventors: Bruno Sander, Ludwigshafen; Siegfried Marquardt, Bobenheim-Roxheim; Uwe Kempe, Dannstadt-Schauernheim; Wolfgang Vodrazka, Freinsheim; Gero Lueth, Mannheim, all of Fed. Rep. of Germany

[73] Assignee: BASF Aktiengesellschaft, Ludwigshafen, Fed. Rep. of Germany

[21] Appl. No.: 648,534

[22] Filed: Jan. 30, 1991

[30] Foreign Application Priority Data

Feb. 3, 1990 [DE] Fed. Rep. of Germany ....... 4003242

[51] Int. Cl.$^5$ ............................................. C02F 11/10
[52] U.S. Cl. .................................... 210/710; 210/727; 210/747; 210/769; 210/919; 110/346; 405/129; 423/DIG. 20
[58] Field of Search ............... 210/710, 727, 728, 732, 210/733, 747, 769, 919; 110/346; 405/129; 423/DIG. 20

[56] References Cited

U.S. PATENT DOCUMENTS

| 1,967,197 | 8/1931 | Besselievre | 210/769 |
| 3,279,603 | 10/1966 | Busse | 210/769 |
| 3,480,542 | 11/1969 | Bucksteeg et al. | 210/769 |
| 4,933,086 | 6/1990 | McMahon et al. | 210/774 |

FOREIGN PATENT DOCUMENTS

| 0213402 | 7/1986 | European Pat. Off. . | |
| 0286872 | 3/1988 | European Pat. Off. . | |
| 3046146 | 7/1982 | Fed. Rep. of Germany | 210/769 |
| 63283799 | 11/1988 | Japan | 210/769 |

Primary Examiner—Stanley S. Silverman
Assistant Examiner—Krisanne Shideler
Attorney, Agent, or Firm—Keil & Weinkauf

[57] ABSTRACT

The soot obtained in the form of a soot-containing aqueous waste liquor in the course of synthesis gas manufacture is utilizable by
a) mixing said liquor in a sewage sludge treatment plant with a sewage sludge to which organic flocculants are added as drainage aids with or without a further quantity of finely divided coal or ash,
b) filtering this pretreated sludge mixture,
c) incinerating the resulting filter cake and
d) burying the ash in a sanitary landfill.

1 Claim, No Drawings

UTILIZATION OF SOOT FROM SYNTHESIS GAS PRODUCTION IN SEWAGE TREATMENT

The present invention relates to a process for utilizing the soot obtained in the production of synthesis gas in the form of a soot-containing waste liquor. The soot is present in the waste liquor in a very finely divided state.

The production of synthesis gas by partial oxidation of heavy fuel oil or oil residues produces a finely divided soot which must be continuously eliminated from the process by scrubbing the soot-containing gas with water.

The soot content of the waste liquor varies with the particular conditions under which the process is carried out, within the range from 0.5 to 5.0% by weight. The ash content of the soot ranges from 1 to 15% by weight, depending on the feedstock and the process. The ash contains heavy metals, chiefly nickel and vanadium. The heavy metal content is particularly high from oil residue feedstock.

Disposal of the soot-containing waste liquor in a biological water treatment plant is possible in principle. However, with this option it is likely that the very finely dispersed soot will neither become bound to the activated sludge flocs nor settle out in the final sedimentation tank, and thus will pass into the receiving water. Furthermore, there is always a danger that toxic heavy metals will be eluted from the ash of the soot and thus will pass into the treatment plant effluent.

European Patent Application 286,872 discloses separating the heavy metal soot from the aqueous liquor and converting it into a landfillable form in a process in which the soot-containing liquor is treated with calcium hydroxide and organic flocculants, predewatered by gravity filtration and completely dewatered by pressure filtration within the range from 0.5 to 15 bar. Immobilization of the heavy metals is achieved by adding sufficient calcium hydroxide to the soot-containing waste liquor so that the pH of an aqueous extract of the resulting filter cake is more than 11.8, preferably more than 12.0.

However, the aforementioned disposal technique of separating the soot from the liquor and landfilling the sooty filter cake is expensive. Since the residual moisture contents of the sooty filter cake are within the range from 75 to 80%, the quantity left over for landfilling is very high at 4-5 tons of filter cake per ton of soot dry matter. A further disadvantage is that by landfilling the sooty filter cake the heating value of the soot is lost.

It is an object of the present invention to develop a process which strongly reduces the landfillable remainder, which utilizes the heating value of the soot, and which dramatically cuts the total disposal costs.

We have found that this object is achieved according to the present invention by
mixing the aqueous soot-containing waste liquor in a sewage sludge treatment plant with a sewage sludge to which organic flocculants are added as drainage aids with or without a further quantity of finely divided coal or ash,
filtering this pretreated sludge mixture,
incinerating the resulting filter cake and
burying the ash in a sanitary landfill.

It is completely surprising that in consequence of the treatment according to the present invention the heavy metals of the aqueous soot liquor are not solubilized. The filtrates obtained from filtering the sludge therefore do not show any increase in the nickel and vanadium contents.

Immobilization (insolubilization) of the heavy metals present in the soot-containing waste liquors was hitherto only possible by treating with milk of lime (European Patent Application 286,872) or with calcium carbonate (milk of lime) and with an iron salt solution (European Patent Specification 213,402).

It was also unforeseeable that the heavy metals become completely bound into the ash or electrofilter dust during the subsequent incineration of the sewage sludge filter cake.

Steps (1) and (2) of the process can be basically carried out in accordance with the processes for the dewatering of sewage sludges on filter presses described in European Patent Specifications 53,250 and 53,251. In these processes, sewage sludges are mixed with aggregates, such as finely divided coal or ashes or mixtures thereof, in an amount of from 0.5 to 1.5 parts by weight per part by weight of sludge solids, treated with organic flocculants in an amount of 1-7 or 2-8 kg per metric t of sludge solids, and finally substantially dewatered by pressure filtration on filter presses.

The addition of finely divided carbons but also the particular form of sludge conditioning (step 1) and sludge dewatering (step 2) produces filter cakes capable of self-sustaining combustion in fluid-bed or multiple-hearth incinerators. There is no need for any energy-consuming drying of the sewage sludge filter cakes or for the addition of further quantities of finely divided coals and/or heating oil in order that the filter cakes become combustible. The process accordingly uses the minimum amount of coal required for achieving self-sustaining combustion of the sewage sludge filter cake.

It is a further object of the present invention to utilize the heating value of the soot from the production of synthesis gas.

We have found that this object is achieved by adding to the soot-containing waste liquor a sewage sludge which is to be dewatered by the process of European Patent Specification 53,250 or 53,251 and then incinerate the dewatered mixture.

This makes it possible to replace all or at least some of the finely divided coal required for the self-sustaining combustion of the sewage sludge filter cakes by soot from the production of synthesis gas. In this way it is possible to utilize the heating value of the soot and to reduce the use of primary energy sources.

A sewage sludge for the purposes of the present invention is a primary sludge as obtained in the pretreatment stage of a wastewater treatment plant by sedimentation of the sludge solids; an activated sludge which is continuously eliminated as excess from biological waste water treatment plants; a mixed sludge as formed by mixing an activated sludge and a primary sludge; or a digested sludge. This sludge can be of municipal, industrial or mixed origin.

The solids content of such sludges is in general from 0.5 to 5.0% by weight. If organic flocculants are used even at the sludge thickening stage, the solids content of the sludge is higher.

To improve the dewaterability of sewage sludge to which the soot-containing waste liquor has been added, organic flocculants are used. It is possible to use commercial flocculant grades. They are water-soluble macromolecular compounds obtained by polymerization or copolymerization of acrylamide, acrylic acid and/or salts thereof or of esters of acrylic or methacrylic acid which have been specifically modified via their alcohol component. These flocculants also differ with respect to their electric charge (cationic, anionic or neutral) and with respect to their degree of polymerization.

The flocculants are used in the form of their 0.05-0.2% strength aqueous solutions. Such dilute flocculant solutions are prepared from the solid and liquid commercial products in a conventional manner in conventional apparatus.

The flocculant quantities required vary from 1 to 8 kg of flocculant/metric t of sludge solids. The amount is dependent on the particular type of sludge and on the solids concentration.

The organic flocculants which are to be used for improving the dewatering characteristics of the sludge mixtures according to the present invention can be preselected in the laboratory, for example by methods described in European Patent Specification 8425.

The amount of coal required for a self-sustaining combustion of sewage sludge filter cakes can likewise be determined in the laboratory by the methods of European Patent Specification 8425.

If finely divided coal alone is used, the mixing ratio of coal dry matter (CDM):sludge dry matter (SeDM) varies within the range from 0.1:1 to 2.0:1. The amount of coal required is strongly dependent on the dewatering characteristics of the particular sewage sludge.

Sewage sludge incineration is predominantly practiced in large treatment plants to cope with the large quantities of sludge produced. However, the soot quantities produced in synthesis gas plants are in general not sufficient to cover the amount of carbon required for self-sustaining combustion of sewage sludge filter cakes. In these cases, finely divided coal is added alone or together with ash.

Suitable coals are fine coals as obtained on separating fine coal and gangue by flotation and subsequent dewatering; coal sludge as produced in wet treatment processes; and also classified fractions of power station coals or of green coke from refineries up to 1 mm in particle size.

If it is desired to add an ash as a further aggregate, a suitable ash for this purpose is that obtained from the incineration of sewage sludges at the same site. It is also possible to use ashes obtained from the incineration of hard coal in power stations.

If ash is used as an additional aggregate, the mixing ratios of CDM:ADM (ash dry matter):SeDM are within the range from 0.2:0.3:1 to 0.6:1:1. The carbon dry matter requirement may in these cases be partially or completely replaced by soot dry matter.

The soot liquor and the aggregates which may be necessary are homogeneously dispersed in the sewage sludge with the aid of mixing units. These units may be operated batchwise or continuously. Of particular suitability are twin-shaft mixers.

The flocculant solutions are added either into these mixing units or else upstream or downstream the charging pump for the downstream filter presses.

Suitable filter presses are compartment type filter presses, frame type filter presses and membrane type filter presses. These filter presses are operated batchwise under relatively deep layers from 20 to 40 mm in thickness. If the dewatering is carried out on these filter presses, preference is given to coal-ash conditioning, since this requires the construction of a drainage system if high degrees of dewatering are to be achieved.

The filtration time is within the range from 90 to 180 minutes. Pressures of up to 15 bar are employed. If the measures according to the present invention are complied with, the filter cake comes away cleanly from the filter cloth, permitting automatic separation.

The achieved solids contents of the filter cakes are within the range from 35 to 55%, depending on the dewaterability of the sewage sludge and the level of the soot content. The heating value of the filter cake is 4600-6300 kJ/kg (1100-1500 kcal/kg). The filter cake is capable of self-sustaining combustion.

The process according to the present invention can also be practiced on continuous dewatering machines, for example belt filter presses or vacuum filters. In these cases, pure coal conditioning produces good results. The thickness of the filter cake is in general from 3 to 15 mm. The addition of ash is therefore not necessary. The solids content and the heating value of the filter cake, in particular if dewatered on a belt filter press, are the same as with the abovementioned filter presses.

The use of soot from synthesis gas manufacture instead of commercial finely divided coal for conditioning and dewatering sewage sludge is not found to produce any disadvantages as regards filtration times or the detachability of the filter cake from the filter cloth.

One economic advantage of the process according to the present invention is that the production plant requires no additional waste water treatment plant in which soot needs to be separated off and converted into a landfillable form by chemical treatment. The soot liquor can be disposed of as such in existing dewatering and incinerating equipment.

The particular advantages of the process according to the present invention are that the heating value of the soot is utilized and that the amount which has to be landfilled is dramatically reduced. Whereas in the processes described in European Patent Specification 213,402 and European Patent Application 286,872 from 4 to 5 tons of filter cake had to be landfilled per ton of soot dry matter, this amount has now come down to 0.04-0.06 ton of ash per ton of soot dry matter. This greatly helps to ease the pressure on scarce landfill resources.

The present invention is further illustrated in the following by reference to Examples. The percentages are always by weight.

The Examples were carried out using a mixed sludge from a mechanical-biological treatment plant which was about 90% activated sludge and about 10% primary sludge and whose organic sludge dry matter content (SeDM) was 55-65%. The low heating value of the sludge dry matter was on average 14,600 kJ/kg (3500 kcal/kg).

The soot-containing aqueous waste liquor (soot liquor) used was an aqueous soot suspension formed in the scrubbing of soot-containing synthesis gases produced from oil residues. The low heating value of this soot was within the range from 27,000 to 31,000 kJ/kg (6450-7400 kcal/kg), the average being 29,000 kJ/kg (6900 kcal/kg).

The finely divided coal used was a flotation coal concentrate having a low heating value of 29,300 kJ/kg (7000 kcal/kg).

The ash used was the fly ash from the incineration of the flotation coal-conditioned and dewatered mixed sludge.

EXAMPLE 1

1000 g of mixed sludge having an SeDM content of 3.8% were initially mixed with 115 g of soot liquor. The soot liquor had a soot content of 2.0%, with the soot containing 0.17% of nickel and 0.26% of vanadium.

26.6 g of water-moist flotation coal having a coal content of 77% and 26.6 g of dry ash were then added and mixed in.

The stirrer used was a paddle stirrer, edge length 70×70 mm, with 4 square holes of 1 cm$^2$ each. The stirrer speed was 300 min$^{-1}$, and the total stirring time was 30 minutes.

The mixing ratio of the components StDM (soot dry matter):CDM:ADM:SeDM was 0.06:0.54:0.7:1. The total quantity of carbon was 10% soot.

The mixture was admixed with 133 ml of a 0.2% strength aqueous solution of an organic flocculant of 60% cationic modification and stirred at 200 min$^{-1}$ for 30 seconds.

1000 g of the flocculated mixture were then discharged onto a Büchner funnel 120 mm in diameter, holding an emplaced polypropylene filter cloth, and subjected to a gravity filtration.

The filtrate was virtually solids-free and contained 1 mg of nickel/l and less than 0.5 mg of vanadium/l.

After 30 minutes' gravity filtration, the filter residue was compressed in a laboratory ram press (filter area 145×145 mm) between two polypropylene filter cloths at 10 bar for 2 minutes. The result was a firm, stable filter cake having the following characteristics:

total solids content: 48.3%
SeDM content: 21.0%
low heating value LHV: 5497 kJ/kg (1314 kcal/kg)

The filter cake was capable of self-sustaining combustion.

COMPARATIVE EXAMPLE

A mixture was prepared as described in Example 1, except that no soot liquor was added. The amount of water-moist coal added was increased to 29.6 g. The mixing ratio of the dry matter contents CDM:ADM:SeDM was 0.6:0.7:1.

The mixture was otherwise treated as described in Example 1.

The filtrate from this mixture contained 1 mg of nickel/l and less than 0.5 mg of vanadium/l.

The laboratory pressed filter cake was found to have the following characteristics:

total solids content: 48.3%
SeDM content: 21.0%
low heating value LHV: 5501 kJ/kg (1315 kcal/kg)

EXAMPLE 2

A mixture was prepared from mixed sludge, soot liquor, coal and ash and treated, both steps being carried out as described in Example 1. However, the mixing ratio of StDM:CDM:ADM:SeDM was 0.3:0.3:0.7:1. Half the carbon content was soot.

The filtrate from this mixture contained 1 mg of nickel/l and less than 0.5 mg of vanadium/l, these content figures being the same as in the comparative example without the addition of soot.

The filter cake from the laboratory press had the following characteristics:

total solids content: 46.0%
SeDM content 20.0%
low heating value LHV: 5095 kJ/kg (1218 kcal/kg)

The filter cake was capable of self-sustaining combustion.

EXAMPLE 3

A mixture was prepared from mixed sludge, soot liquor and ash (without coal) and processed, both steps being carried out as described in Example 1. The mixing ratio of StDM:ADM:SeDM was 0.6:0.7:1. The carbon content was 100% soot.

The filtrate from this mixture was found to contain 1 mg of nickel/l and less than 0.5 mg of vanadium/l, as in the comparative example without the addition of soot.

The filter cake from the laboratory press had the following characteristics:

total solids content: 43.5%
SeDM content: 18.9%
low heating value LHV: 4643 kJ/kg (1110 kcal/kg)

The filter cake was capable of self-sustaining combustion.

EXAMPLE 4

A mixture was prepared from mixed sludge, soot liquor and coal (without the addition of ash) as described in Example 1 and treated as described in Example 1. The mixing ratio of StDM:CDM:SeDM was 0.65:0.65:1.50% by weight of the total carbon content was soot.

The filtrate from this mixture contained 1 mg of nickel/l and less than 0.5 mg of vanadium/l.

The filter cake from the laboratory press was found to have the following characteristics:

total solids content: 37.7%
SeDM content: 16.4%
low heating value LHV: 6927 kJ/kg (1656 kcal/kg)

The filter cake was capable of self-sustaining combustion.

EXAMPLE 5

154 kg of mixed sludge having an SeDM content of 5.1% were first mixed with 13.8 kg of soot liquor having a soot content of 4.3%. The soot in the soot liquor contained 0.36% of nickel and 1.5% of vanadium.

In addition, 8.3 kg of an aqueous flotation coal suspension having a coal content of 40% and 6.3 kg of dry ash were added and mixed in homogeneously.

The mixing ratio of StDM:CDM:ADM:SeDM was 0.075:0,425:0.8:1. The proportion of soot in the total quantity of carbon was 15%.

The mixture was pumped into a pilot compartment type filter press, 450×450 mm, comprising 4 compartments, plate spacing 30 mm, for dewatering. The intake side of the pump was continuously supplied with 0.17 l l of an 0.2% strength solution of an organic flocculant of 60% cationic modification per kg of mixture.

After 140 minutes the filtration was complete at a final pressure of 15 bar.

The filtrate contained less than 0.5 mg of nickel/l and also less than 0.5 mg of vanadium/l. The same values were found in the filtrate of a comparative test without the addition of soot.

After the filter press was opened, the filter cake came away on its own from the filter cloth.

Characteristics of filter cake (averages):
total solids content: 52.0%
SeDM content: 22.6%
low heating value LHV: 5433 kJ/kg (1299 kcal/kg)

The filter cake was combustible in a fluid-bed incinerator without additional fuel.

EXAMPLE 6

In a sludge treatment plant of a mechanical-biological treatment plant, a continuous mass flow of 80 metric t of mixed sludge/h having an SeDM of 5% was admixed in a twin-shaft mixer with the following substances: 8 metric t of soot liquor/h containing 2.5% of soot 5.2 metric t of coal suspension/h containing 50% of coal 2.6 metric t of ash/h The soot of the soot liquor contained 1.0% of nickel and 2.5% of vanadium.

The mixing ratio of StDM:CDM:ADM:SeDM was 0.05:0.65:0.65:1. The soot accounted for 7% of the total carbon content.

The mixture was pumped into a compartment type filter press (frame dimensions 2×2 m, frame spacing 30 mm) for dewatering. Beforehand an additional quantity comprising 16 t/h of a 0.2% strength solution of an organic flocculant of 60% cationic modification was metered continuously into the pipeline (intake side of the pump).

The filtrate ran back into the activation tank of the treatment plant. It contained less than 0.5 mg of nickel/l and also less than 0.5 mg of vanadium/l.

The filtration process was complete at a pressure of 15 bar, and the compartments were opened. The filter cakes fell away on their own into the collecting shaft.
Characteristics of filter cakes
  total solids content: 48–50%
  SeDM content: 20–21%
  nickel content: 0.02%
  vanadium content: 0.045%
  low heating value LHV: 5900–6250 kJ/kg (1400–1500 kcal/kg)

The filter cakes were then combusted in a fluid-bed incinerator.

Combustion temperatures and exhaust gas composition were unchanged compared with the incineration of soot-free filter cakes.

The heavy metals nickel and vanadium present in the soot were eliminated completely in the electrofilter together with the fly ash. The nickel content of electrofilter dust rose by a factor of 2 and the vanadium content by a factor of 4.

The fly ash was buried in a sanitary landfill for special waste.

We claim:

1. A process for utilizing the soot-obtained in the production of synthesis gas in the form of an aqueous soot-containing scrubber waste liquor, which comprises
   a) mixing said liquor in a sewage sludge treatment plant with a sewage sludge to which organic flocculants are added as drainage aids with or without a further quantity of finely divided coal or ash, thereby forming a fixture, wherein said liquor is added in an amount sufficient to yield a filter cake having a heating value in the range of about 4600–6300 kJ/kg upon filtration,
   b) filtering this sludge mixture, thereby producing a filter cake,
   c) incinerating the filter cake thereby producing an ash and
   d) burying the incinerated ash in a sanitary landfill.

* * * * *